US011988313B2

(12) United States Patent
Geissler et al.

(10) Patent No.: US 11,988,313 B2
(45) Date of Patent: May 21, 2024

(54) COUPLER FOR FIRE EXTINGUISHER NOZZLE ACCESSORY

(71) Applicant: RUSOH, Inc., Eau Claire, WI (US)

(72) Inventors: Ryan J. Geissler, Eau Claire, WI (US); Kimberly Robert Nessel, Altoona, WI (US)

(73) Assignee: Rely Innovations, Inc., Eau Claire, WI (US)

( * ) Notice: Subject to any disclaimer, the term of this patent is extended or adjusted under 35 U.S.C. 154(b) by 295 days.

(21) Appl. No.: 17/442,909

(22) PCT Filed: Mar. 24, 2020

(86) PCT No.: PCT/US2020/024499
§ 371 (c)(1),
(2) Date: Sep. 24, 2021

(87) PCT Pub. No.: WO2020/198248
PCT Pub. Date: Oct. 1, 2020

(65) Prior Publication Data
US 2022/0163154 A1 May 26, 2022

Related U.S. Application Data

(60) Provisional application No. 62/824,028, filed on Mar. 26, 2019.

(51) Int. Cl.
*F16L 37/23* (2006.01)
*B05B 15/65* (2018.01)

(52) U.S. Cl.
CPC .............. *F16L 37/23* (2013.01); *B05B 15/65* (2018.02)

(58) Field of Classification Search
CPC ............ F16L 37/23; F16L 37/38; A62C 13/76
See application file for complete search history.

(56) References Cited

U.S. PATENT DOCUMENTS

| 2,565,572 | A | | 8/1951 | Pangborn |
| 3,972,373 | A | | 8/1976 | Nichols et al. |
| 4,086,939 | A | * | 5/1978 | Wilcox ................... F16L 37/23 |
| 4,582,347 | A | * | 4/1986 | Wilcox ................... F16L 37/23 |
| 5,445,358 | A | | 8/1995 | Anderson |
| 7,028,711 | B1 | * | 4/2006 | Scott ........................ F16L 37/23 |

(Continued)

FOREIGN PATENT DOCUMENTS

| DE | 1099285 B | 2/1961 |
| EP | 1199507 A2 | 4/2002 |

*Primary Examiner* — Zachary T Dragicevich
(74) *Attorney, Agent, or Firm* — Kenneth A. Smith

(57) ABSTRACT

A push-to-connect and quick-release coupler can be provided. In an example, the coupler can be used with or coupled to a fire extinguisher nozzle. The coupler can include a socket body and an automatic locking assembly. In an example, the locking assembly can include a collar movably coupled with the socket body, and a movable locking element. In a locked configuration, a fire extinguisher nozzle can be retained in the socket body, and the collar can be disposed in a first position, and the locking element can be biased by the collar toward the plug portion of the fire extinguisher nozzle. In a released or unlocked configuration, the nozzle can be removable from the socket body, the collar can be disposed in a second position, and the locking element can be unbiased by the collar.

18 Claims, 13 Drawing Sheets

(56) References Cited

U.S. PATENT DOCUMENTS

| | | |
|---|---|---|
| 2007/0035128 A1 | 2/2007 | Mann |
| 2013/0206261 A1 | 8/2013 | Prust |
| 2014/0264118 A1* | 9/2014 | Tiberghien .............. F16L 37/23 |
| 2018/0112808 A1 | 4/2018 | Madocks |
| 2018/0335173 A1 | 11/2018 | Deluna |
| 2019/0101234 A1* | 4/2019 | Quang ................... F16L 37/23 |
| 2019/0390810 A1* | 12/2019 | Lafond .................. F16L 37/23 |

* cited by examiner

COUPLER FOR FIRE EXTINGUISHER NOZZLE ACCESSORY

CROSS-REFERENCE TO RELATED APPLICATIONS

This patent application claims the benefit of priority to U.S. Provisional Patent Application No. 62/824,024, filed on Mar. 26, 2019, which is incorporated herein by reference in its entirety.

BACKGROUND

A coupler or coupler assembly can be provided to join various conduits, such as pipes, hoses, wires, and the like. Various coupler types can include threaded, non-threaded, gendered, genderless, flanged, or otherwise configured couplers. In an example, a coupler can be configured to provide a permanent or temporary joint between conduits. For example, a permanent joint can be provided by a brass coupler that is soldered or press-fit to join pipes. A semi-permanent joint can be provided by a quick-connect type coupler, such as can include a solderless fitting to join pipes. In an example, a temporary or removeable joint can be provided by a quick-connect and quick-release assembly. In an example, an air hose or pneumatic fitting can be configured for quick-connect or quick-release operation, such as for use with a compressed air supply line.

A portable or hand-held fire extinguisher or fire suppression device can include a discharge point from which a fire extinguishing agent or fire suppression agent can be released. In an example, the discharge point includes or is coupled to a valve assembly, and can be affixed to a body of the fire extinguisher. In an example, the fire extinguisher can be configured to discharge agent through a hose, and a distal end of the hose can include a valve assembly configured to control a flow of the agent from the hose. The hose can be flexible, for example, to allow a user to aim released fire extinguishing agent in various directions.

BRIEF SUMMARY

The present inventors have recognized, among other things, that a problem to be solved includes providing means for quickly connecting and disconnecting components with a fluid supply line such as a hose or conduit. The problem can include providing a connector or coupler operable in a one-step, push-to-connect manner such that a secure and leak-free coupling can be effected by a user in a single coupling motion. The problem can include providing means for decoupling a secure and leak-free connection between conduits. In an example, the problem can include providing a coupler for communicating a pressurized, flowable material such as a fire extinguisher agent, gas, or other fluid material.

In an example, the problem can include providing a fire extinguisher nozzle that is usable or useful to dispense a fire extinguisher agent, or that can be coupled with a dispenser accessory. The dispenser accessory can be configured to dispense the agent, for example, at a different dispersion rate than the nozzle, or in a different dispersion pattern than one provided by the nozzle. In an example, the problem can include providing a coupler for attaching the fire extinguisher nozzle to the dispenser accessory.

The present inventors have recognized that a solution to these and other problems can include a push-to-connect and quick-release coupler or coupling socket. The coupler can include a socket body, such as extending between first and second socket faces, and the first socket face is configured to receive a plug. In an example, the plug can include a fire extinguisher nozzle or a portion of such a nozzle. The coupling socket can further include a plug receiver provided at least partially inside the socket body and slidable or movable axially relative to the socket body. In an example, a first end of the plug receiver can be configured to couple with a nipple or dispenser tip of the plug or nozzle, and a second end of the plug receiver can be configured to dispense flowable material received from the plug or nozzle. In an example, the second end of the plug receiver can be coupled to, or can comprise a portion of, a dispenser accessory configured to release fire extinguisher agent in a particular manner or at a particular rate. In an example, the coupler can further include a collar that is movably or slidably coupled along the socket body between a locked-coupling configuration and an unlocked configuration. In the unlocked configuration, the first end of the plug receiver can be disposed distal to the second socket face, and a locking element can be unbiased by the collar. In the locked configuration, the first end of the plug receiver can be disposed proximal to the second socket face, and the collar can bias the locking element toward a lock receiver of the plug.

This brief summary is intended to provide an overview of some subject matter of the present document. It is not intended to provide an exclusive or exhaustive explanation of the invention. The detailed description is included to provide further information.

BRIEF DESCRIPTION OF THE SEVERAL VIEWS OF THE DRAWINGS

In the drawings, which are not necessarily drawn to scale, like numerals may describe similar components in different views. The drawings illustrate generally, by way of example, but not by way of limitation, various embodiments discussed in the present document. To easily identify the discussion of any particular element or act, the most significant digit or digits in a reference number may refer to the figure number in which that element is first introduced.

DETAILED DESCRIPTION

Quick-connect fluid couplers can be generally configured to enable ready coupling and uncoupling of a coupler pair by way of an interlocking means and a releasing device responsive to push, pull, or gripping motions. Single-point attachment push-to-connect/pull-to-disconnect couplers can be useful in some environments. However, a pull-to-disconnect coupler can be undesirable in other environments or use cases where unintentional decoupling could cause harm to a nearby operator or property. For example, if a pull-to-disconnect coupler is used with a fluid system under pressure, it is possible that a force of the fluid can cause the coupler to disconnect, which in turn can lead to a rapid and unintentional loss of fluid. In another example, if a pull-to-disconnect coupler is used with a piercing wand of a fire extinguisher, it is possible that the coupler would disconnect as the operator positions or repositions the wand, such as in a wall or under a vehicle hood.

In an example, systems and methods discussed herein can include or use a quick-connect fluid coupler adapted for rapid push-to-connect action, with locking and adjust-to-disconnect action. In an example, the connectors or couplers discussed herein can be substantially self-aligning with nozzle or hose components, and can optionally be operated single-handedly.

Figure 1:
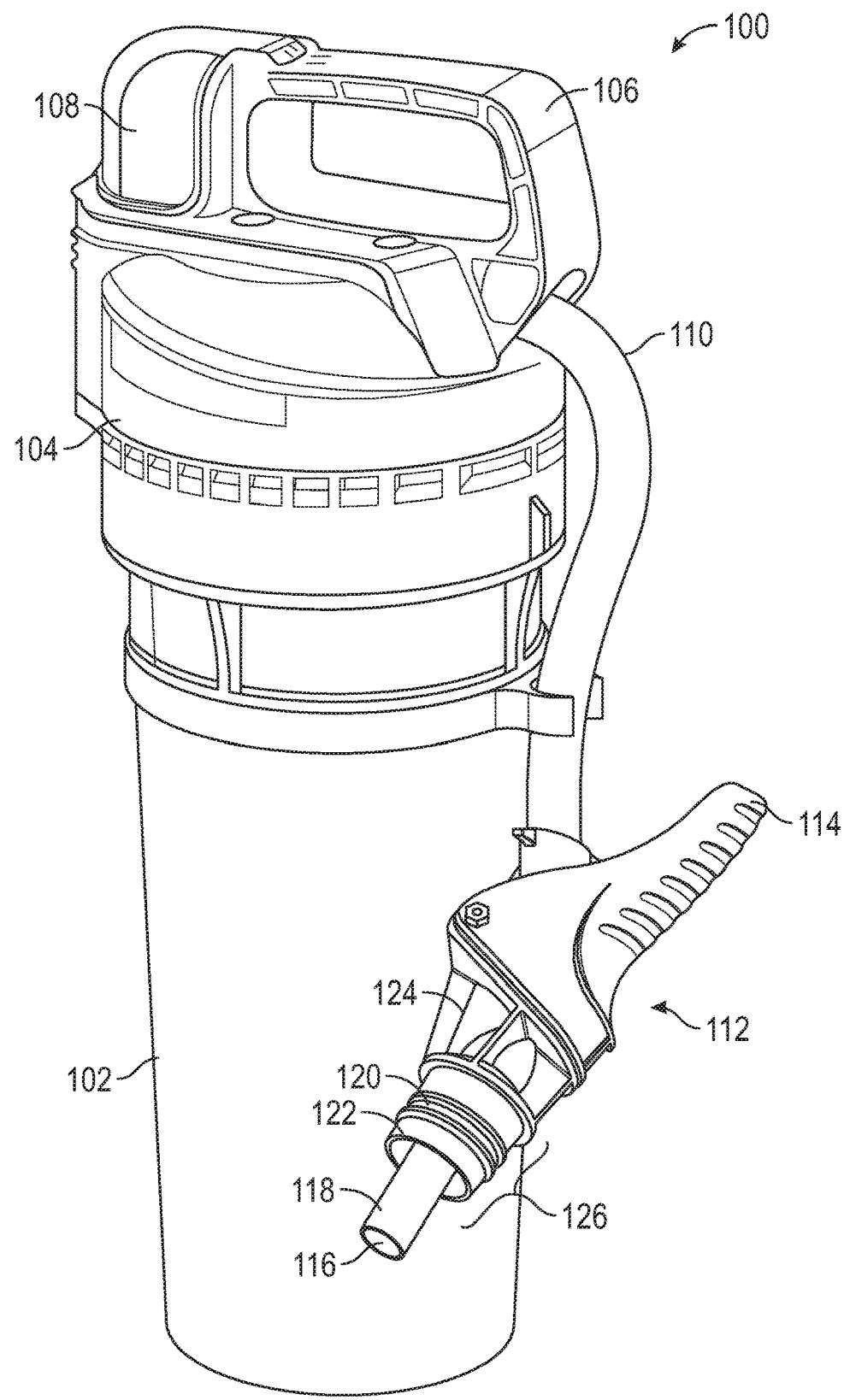
FIG. 1 illustrates a fire extinguisher in accordance with one embodiment.

FIG. 1 illustrates generally an example of a fire extinguisher 100. The fire extinguisher 100 can have a substantially cylindrical shape and can include a bottom housing 102 and a top housing 104. The housings can be made from lightweight resilient materials such as plastic, or can be made of metals, alloys, or other resilient materials. The bottom housing 102 can optionally be made using a transparent or translucent material to allow for visual inspection of internal components or extinguisher agent inside the fire extinguisher 100. In an example, the top housing 104 can be screwed onto the bottom housing 102 or can be otherwise attached using a bayonet or latching mechanism. In an example, the bottom housing 102 can have an enlarged top opening to allow easier filling of the bottom housing 102 (or filling of a container housed inside the bottom housing 102) such as with fire suppressant agents or materials. In an example, a storage or hanging mechanism can be incorporated into the housings, or can wrap around the body of the fire extinguisher 100.

The fire extinguisher 100 can include a handle 106, such as can be coupled to or integrated with the top housing 104. The handle 106 can be configured to allow an operator to hold the fire extinguisher 100 by placing a hand or fingers through a grip area. The fire extinguisher 100 can be held in an upright orientation such as for transportation or use.

In an example, the fire extinguisher 100 can include a replaceable, pressurized gas cartridge 108. The gas cartridge 108 can optionally be integrated with or comprise a portion of the handle 106. The gas cartridge 108 can include, for example, a cartridge of carbon dioxide ($CO_2$) or of another gas or compressible material that generally does not promote spreading of a fire. Gas within the gas cartridge 108 can be under high pressure and possibly in a liquid state. The gas can be controllably released to pressurize an agent reservoir in the fire extinguisher 100 and can be used to expel fire extinguisher agent from the extinguisher. A trigger mechanism can be provided to activate the pressurized gas cartridge 108 and expel the agent, such as using a flexible hose 110 and nozzle assembly 112.

In an example, the nozzle assembly 112 can include an actuator 114, such as can include a hand-actuated lever that an operator can use to open or close a valve in the nozzle assembly 112. The valve can inhibit release of extinguisher agent unless and until the operator depresses the actuator 114. When the actuator 114 is depressed, agent can be released from a nozzle outlet 116 at a distal side of the nozzle assembly 112.

A distal end portion of the nozzle assembly 112 can include a plug tip portion 126. The plug tip portion 126 can comprise the nozzle outlet 116, a nipple 118, a nozzle housing sidewall 122, and a housing groove 120. In an example, the plug tip portion 126 comprises a portion of the nozzle assembly 112 that can be coupled with one or more fire extinguisher accessories, such as using a coupler.

In an example, it can be desirable to use the fire extinguisher 100 to combat different types of fire events such as can occur in various different environments. In an example, the fire extinguisher 100 can be configured for use with various types or configurations of nozzles or other extinguisher accessories, such as to tailor the use of the fire extinguisher 100 for the different fire events or environments. For example, a wide dispersion pattern nozzle can be useful to deliver agent over a wide area, whereas a puncturing nozzle can be useful to deliver agent in a targeted area, such as beneath of hood of a car or inside of a studded wall. In an example, other nozzles or nozzle accessories can be configured to be quickly coupled with the nozzle assembly 112 or decoupled from the nozzle assembly 112 such as using the various couplers discussed herein.

Figure 2:
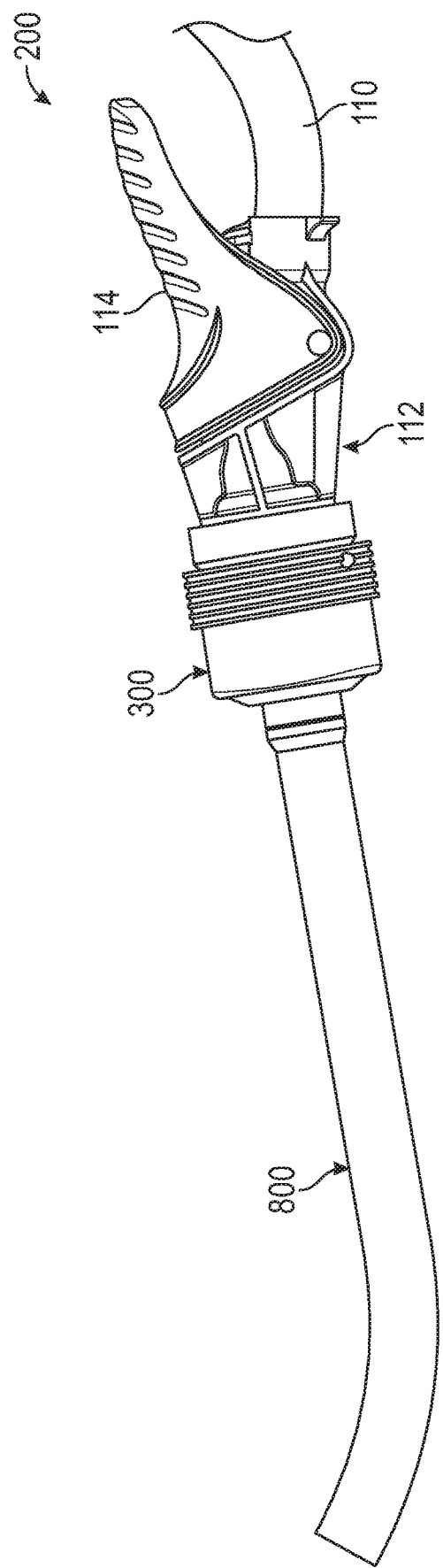
FIG. 2 illustrates a nozzle and accessory assembly in accordance with one embodiment.

FIG. 2 illustrates generally a first nozzle and accessory assembly 200. The nozzle and accessory assembly 200 can include the nozzle assembly 112, such as can be configured to receive a fire extinguishing agent via the flexible hose 110. The nozzle assembly 112 can be coupled to a wand accessory 800 using a coupler 300. In an example, the coupler 300 includes a quick-connect type assembly by which an operator can connect the nozzle assembly 112 to the wand accessory 800 using a push-to-connect motion or action. In an example, the coupler 300 can include a push-to-release type assembly by which an operator can disconnect the nozzle assembly 112 from the wand accessory 800 only in response to a particular movement or adjustment performed by the operator. Such a configuration can enable the operator to quickly connect the fire extinguisher 100 to an accessory and can help maintain the fire extinguisher 100 in fluid communication with the accessory unless or until the operator affirmatively disconnects or disengages the fire extinguisher 100 from the accessory. In an example, the coupler 300 includes a collar component, as further described below, that can be turned, moved, or slid axially relative to a body of the coupler 300 to disengage the nozzle assembly 112 from the wand accessory 800.

In an example, the wand accessory 800 includes an elongate tube 804 (see FIG. 8) that is configured to receive agent from the nozzle assembly 112 at a proximal side of the wand and discharge agent from a distal side of the wand. The nozzle and accessory assembly 200 can enable an operator to direct discharged agent toward a target, such as a confined area or difficult to reach area. The nozzle and accessory assembly 200 can extend a reach of an operator, and can help an operator maintain a safe distance from a fire source while simultaneously enabling the operator to direct discharged fire extinguishing agent to the fire source. The nozzle and accessory assembly 200 can be rotated or positioned by an operator to maximize fire extinguishing potential. In an example, the wand accessory 800 can be pointed at the distal end, such as to provide a tool for use by an operator to pierce a barrier, such as an engine hood, sheetrock wall, or other barrier that would otherwise inhibit the operator from targeting a source of a fire.

Other accessories, such as depicted elsewhere herein, can similarly be used together with the coupler 300 or the nozzle assembly 112. In an example, the coupler 300 can be coupled with or attached to an accessory without also being coupled to the nozzle assembly 112. In an example, each of multiple different accessories can be coupled with a respective different coupler such that the different accessories can be quickly swapped between different nozzles, or can be quickly swapped as an operator fights a fire using the fire extinguisher 100 with different types of accessories. For example, an operator of the fire extinguisher 100 may want to use a wide-dispersion type accessory (e.g., coupled to a first instance of the coupler 300) when first approaching a fire, and then use a more targeted, wand-type accessory (e.g., coupled to a second instance of the coupler 300) after the fire is somewhat controlled and the operator can approach the fire source. Thus, the present systems and methods can help facilitate rapidly and securely changing an accessory used with the fire extinguisher 100, such as to enable more effective firefighting with an array of different firefighting tools.

Figure 3:
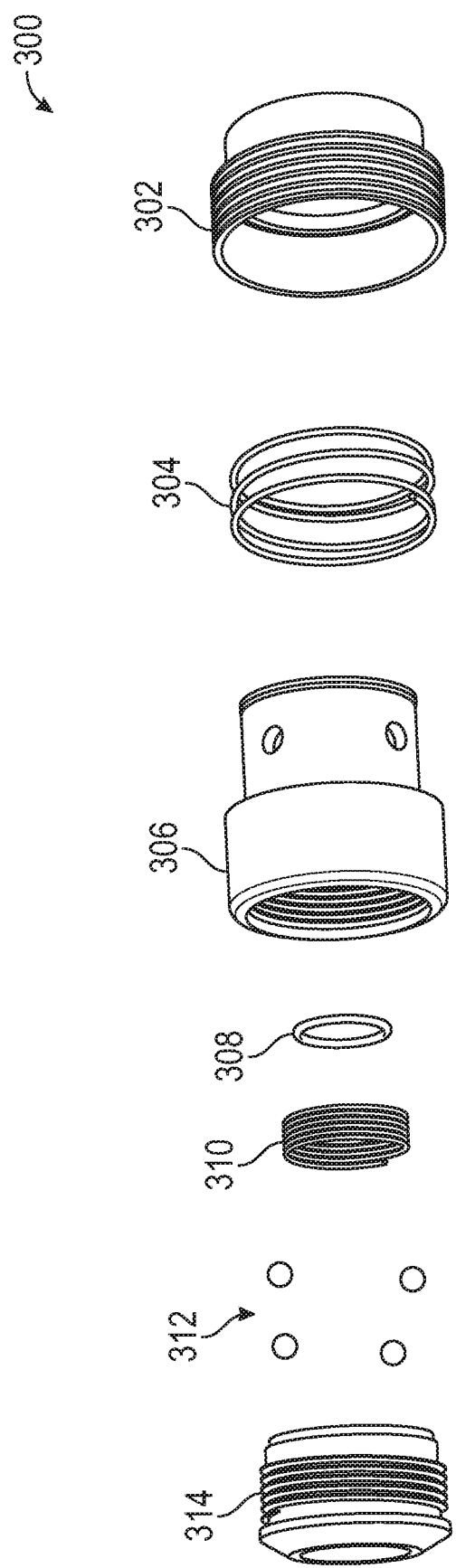
FIG. 3 illustrates an exploded view of a coupler in accordance with one embodiment.

FIG. 3 illustrates generally an exploded view example of the coupler 300. The coupler 300 can include a collar 302, a collar spring 304, an outer socket body 306, a sealing ring 308, a receiver spring 310, one or more locking elements 312, and an inner socket body 314. Operation of the coupler 300 and the components thereof is further illustrated and explained with reference to the examples of FIG. 3 through FIG. 9.

Figure 4:
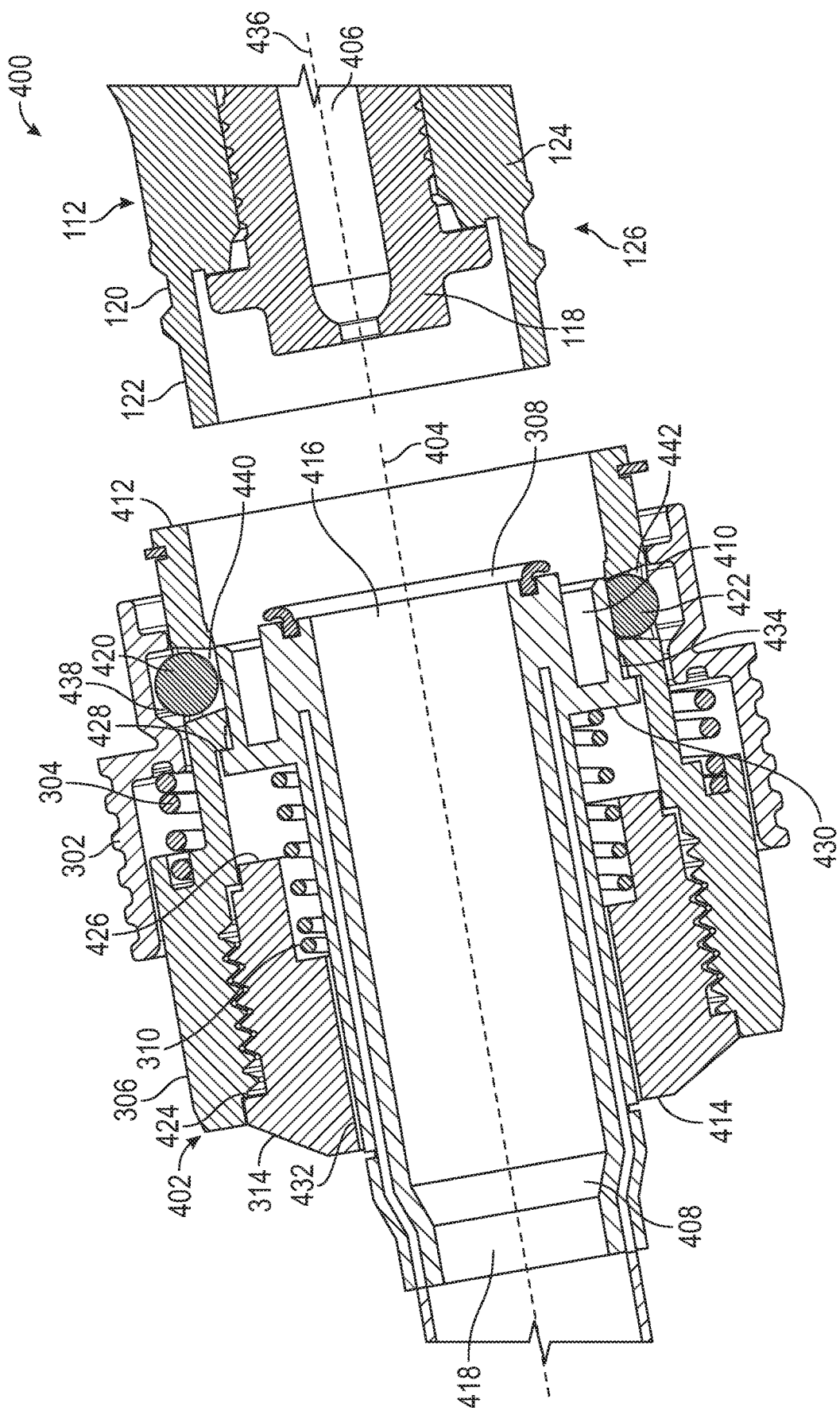
FIG. 4 illustrates generally a cross section view of an example of a coupling system in accordance with one embodiment.

FIG. 4 illustrates generally a cross-section view of a coupling system 400 such as can include the coupler 300 and the plug tip portion 126 of the nozzle assembly 112. In an example, the coupler 300 can be assembled (e.g., as depicted in FIG. 4) and coupled to a plug receiver 408 to provide a socket assembly 402. The plug receiver 408 can comprise a proximal portion of, or can optionally be coupled to, a fire extinguisher accessory for dispensing fire extinguishing agent from the fire extinguisher 100. The plug receiver 408 can be secured to the coupler 300, such as temporarily or permanently. In an example, the plug receiver 408 can be secured to the coupler 300 using one or more of the outer socket body 306, the inner socket body 314, and the receiver spring 310. For example, the outer socket body 306 and inner socket body 314 can be configured to mate together and thereby enclose or lock a portion of the plug receiver 408 therebetween. In other examples, the plug receiver 408 can be integrated with, or can form a portion of, the outer socket body 306 or the inner socket body 314. Various aspects of the plug receiver 408 are illustrated in perspective view in the example of FIG. 8.

In the example of FIG. 4, the nozzle assembly 112 can be coupled with the socket assembly 402 in a push-to-connect manner whereby a user can push or force the nozzle assembly 112 into a receiving portion of the socket assembly 402, such as to bring at least the nipple 118 into contact with the plug receiver 408. The socket assembly 402 can include a locking assembly to receive and retain the nozzle assembly 112. In an example, the locking assembly can be deployed or used without user interaction or manipulation such as other than a force used to position the nozzle assembly 112 and advance it into a first socket face 412 of the socket assembly 402.

In the example of FIG. 4, the nozzle assembly 112 includes the nozzle housing 124 that can at least partially enclose or house the nipple 118. The nipple 118 can be coupled to a plug duct 406. Flowable material in the plug duct 406, such as can be provided under pressure or pressurized, can be released from the nipple 118. The nozzle assembly 112 can include a valve such as can be manually operated by a user or can be automatically operated to control release of a flowable material from the nipple 118.

The nozzle housing 124 can include the nozzle housing sidewall 122 at a distal portion of the nozzle assembly 112. In an example, the nozzle housing sidewall 122 can at least partially surround the nipple 118. The nozzle housing sidewall 122 can include an extended or elongated sidewall. In the example of FIG. 4, the sidewall can be cylindrical, such as provided about a nozzle axis 436. However, the sidewall can have another shape such as a triangular prism shape, an elliptical cylinder shape, or other shape.

In an example, the plug tip portion 126 of the nozzle assembly 112 can be configured to release flowable material in a designated dispersion pattern. For example, if the flowable material is a fire extinguishing agent, then the plug tip portion 126 can be configured to release the agent in one or more of a solid stream, a fine mist, or a shower-type dispersion pattern. Other dispersion patterns can similarly be used. In an example, a dispersion pattern can depend on one or more of a flow rate of the agent through the plug duct 406, a pressurization of the agent, a viscosity of the agent, or other characteristics of the nozzle assembly 112 or the agent.

In the example of FIG. 4, the socket assembly 402 includes the outer socket body 306, the inner socket body 314, the plug receiver 408, and the collar 302. In an example, the plug receiver 408 can include a first end 416 configured to receive at least the nipple 118 from the nozzle assembly 112, and can include a second end 418 configured to release or dispense a flowable material received from the nozzle assembly 112. In an example, the second end 418 of the plug receiver 408 can be coupled to an outlet or discharge accessory. A discharge accessory can include various features to extend the reach, placement, dispersion, flow rate, or other characteristic of a material to be discharged from or using the socket assembly 402.

In an example, different embodiments or instances of the plug receiver 408 can be used with the outer socket body 306 and inner socket body 314. In other words, the same socket body portions can be used with different or differently configured plug receivers. In this manner, output characteristics of a system that includes or uses the socket assembly 402 can be adjusted by a user. Changing an output characteristic can be useful, for example, to change a dispersion pattern of a fire extinguisher agent or depending on conditions of a fire to be extinguished.

In the example of FIG. 4, a portion of the plug receiver 408 can be coupled between portions of the outer socket body 306 and the inner socket body 314 to thereby secure or retain the plug receiver 408 in the socket assembly 402. The outer socket body 306 and inner socket body 314 can be coupled or secured together, for example, using a threaded coupling 424, using a press-fit coupling, or using another permanent or temporary connection means. In other examples, one or more of the outer socket body 306, the inner socket body 314, and the plug receiver 408, can be integrated into one contiguous piece or structure.

In an example, the plug receiver 408 can be movable or slidable along a socket axis 404. Limits on the axial travel of the plug receiver 408 along the socket axis 404 can be established by, for example, mechanical stops on one or more of the plug receiver 408, the outer socket body 306, or the inner socket body 314. In an example, the plug receiver 408 can include a first receiver outer wall 432 and a second receiver outer wall 434, such as can be differently dimensioned. In the example of FIG. 4, the first receiver outer wall 432 and second receiver outer wall 434 can be substantially cylindrical and can have different radii or outer dimensions such that a receiver shelf 430 is formed or provided at an intersection of the first receiver outer wall 432 and the second receiver outer wall 434. The receiver shelf 430 can be configured to contact or impinge on a first shelf stop 426 or a second shelf stop 428 of the socket body. In the example of FIG. 4, the first shelf stop 426 can comprise a portion of the inner socket body 314, and the second shelf stop 428 can comprise a portion of the outer socket body 306.

The plug receiver 408 can travel along the socket axis 404 from a distal position where the receiver shelf 430 contacts the first shelf stop 426 to a proximal position where the receiver shelf 430 contacts the second shelf stop 428. In an example, the socket assembly 402 includes a receiver spring 310 that is configured to bias the plug receiver 408 toward the proximal position. That is, the receiver spring 310 can be configured to press or force the plug receiver 408, and thereby the receiver shelf 430, toward or into contact with the second shelf stop 428. In an example, the plug receiver 408 can receive a biasing force from the receiver spring 310 and, in turn, a sidewall portion of the plug receiver 408 can be used to bias a locking feature of the socket assembly 402.

The socket assembly 402 can include one or more locking features, such as the locking elements 312, that can be configured to secure the nozzle assembly 112 to the socket assembly 402. The example of FIG. 4 illustrates a first locking element 420 and a second locking element 422, however, fewer or additional locking elements can be used. The one or more locking elements can comprise elements having the same or different shapes, sizes, or other characteristics. In the example of FIG. 4, the first locking element 420 comprises a ball, such as a steel ball or ball bearing. The first locking element 420 can be movable relative to body portions of the socket assembly 402.

In an example, the first locking element 420 can be movable substantially radially relative to the socket axis 404. The outer socket body 306 can include one or more passages configured to receive each of the one or more locking elements. That is, the locking elements can move in or through respective ones of the passages, such as radially relative to the socket axis 404. In the example of FIG. 4, the outer socket body 306 includes a first passage 440 configured to receive the first locking element 420, and the outer socket body 306 includes a second passage 442 configured to receive the second locking element 422. In an example, the first passage 440 and the second passage 442 can have tapered sidewalls such that the passages can be frustoconical or funnel shaped. The passages can be configured such that they have a larger open area at an opening that is distal to the socket axis 404 and a smaller open area at an opening that is proximal to the socket axis 404. In an example, a smallest diameter or dimension of the passages, such as nearest the socket axis 404, can be smaller than a largest diameter or dimension of the locking elements such that the locking elements are prevented from moving through the passages. In other words, the locking elements and passages can be configured to permit the locking elements to move relative to a wall of the outer socket body 306 but not to pass through the wall of the outer socket body 306.

The collar 302 can be provided at or around a portion of the outer socket body 306. In an example, the collar 302 is configured to be adjacent to the locking elements and to interface with the locking elements. In an example, the collar 302 includes a first locking element receiver 438 portion that is configured to receive the first locking element 420 when the first locking element 420 moves radially outward or away from the socket axis 404. Other locking element receiver portions can be provided about the collar 302 that locations corresponding to respective ones of the locking elements disposed around the socket assembly 402. In an example, the collar 302 is movable or slidable relative to a body of the socket assembly 402. The collar 302 can be movable independently of other movable portions of the socket assembly 402, such as independently of the plug receiver 408.

In an example, the collar 302 is movable coaxially with the socket axis 404. In an example, the collar 302 is movable between a proximal position in which the collar 302 can be positioned nearest to the first socket face 412 and a distal position in which the collar 302 can be positioned nearer to the second socket face 414.

In an example, the socket assembly 402 can include the collar spring 304. The collar spring 304 can be configured to bias the collar 302 toward the proximal position. That is, the collar spring 304 can be configured to press or force a sidewall portion of the first locking element receiver 438 against the first locking element 420 to thereby encourage or bias the first locking element 420 inward along the radial direction and toward the socket axis 404.

A spring constant can represent a relative stiffness of a spring. A spring constant value, or k-value, can have various values such that a higher k value indicates a stiffer spring, or a spring that is relatively more difficult to stretch or compress than a lower k value spring. In an example, the receiver spring 310 can have a first spring constant k1 and the collar spring 304 can have second spring constant k2. In an example, the first spring constant k1 can be greater than the second spring constant k2. With this relationship between a stiffness of the receiver spring 310 and a stiffness of the collar spring 304, the plug receiver 408 can be forced into the proximal position when the socket assembly 402 is vacant, and thus is ready to receive the nozzle assembly 112. Stated differently, when the socket assembly 402 is empty or detached from the nozzle assembly 112, the relationship between the spring constants of the receiver spring 310 and the collar spring 304 can be configured such that the second receiver outer wall 434 of the plug receiver 408 can force the first locking element 420 into the first locking element receiver 438 of the collar 302 and thereby displace the collar 302 toward the distal end of the socket assembly 402, for example, against a bias force of the collar spring 304.

Figure 5:
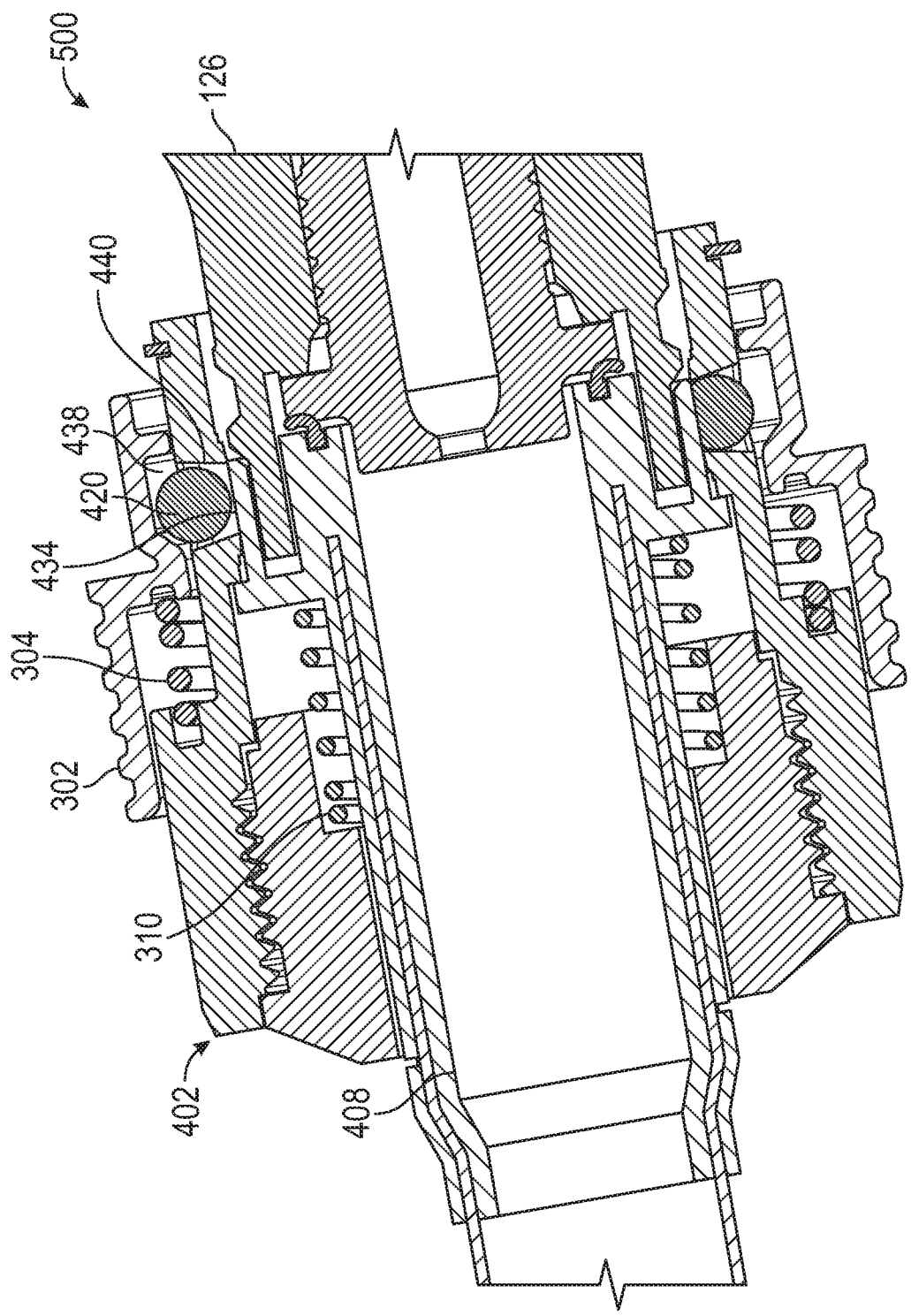
FIG. 5 illustrates a cross section view of a coupling system in a released configuration in accordance with one embodiment.
Figure 6:
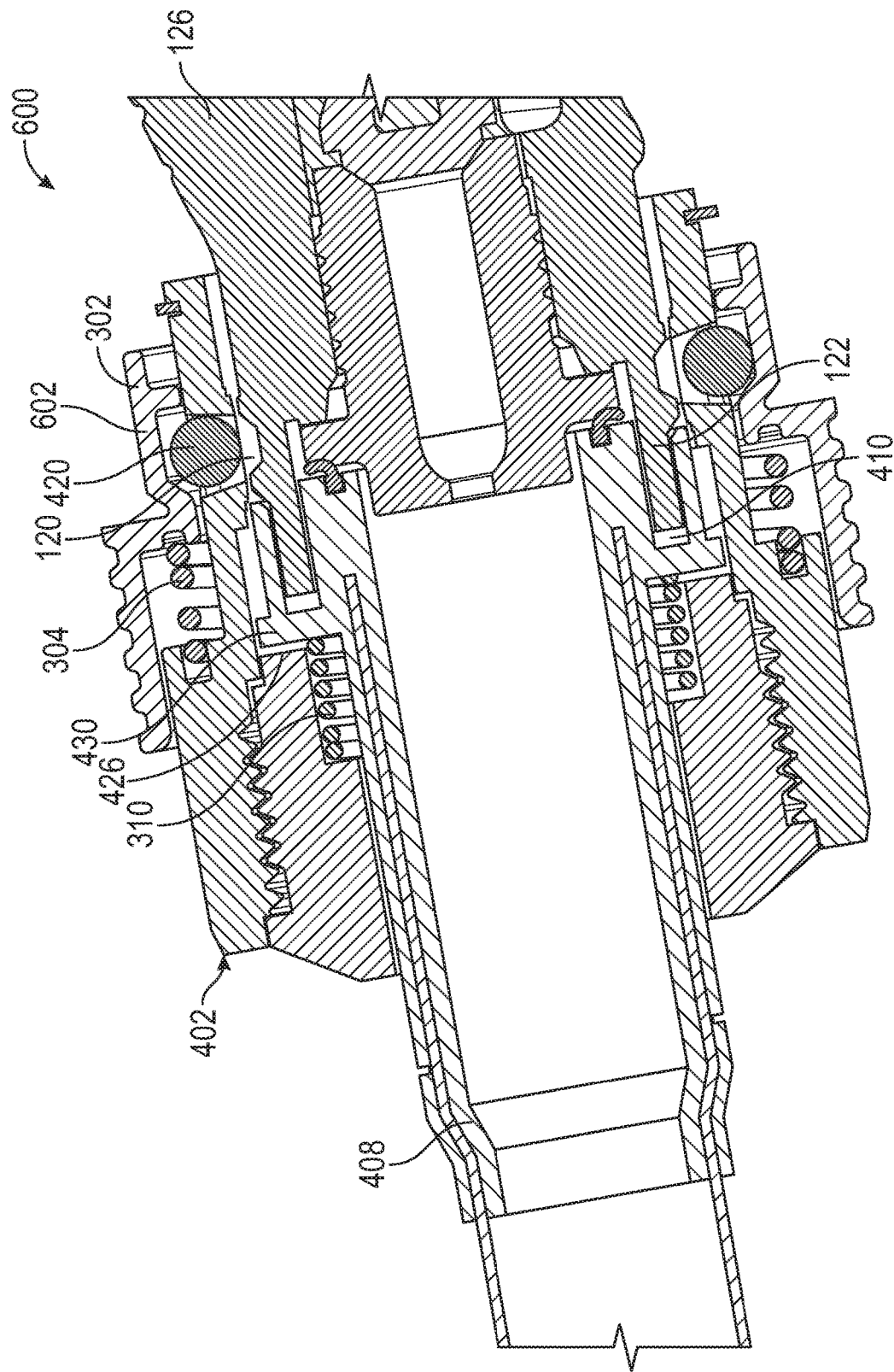
FIG. 6 illustrates a cross section view of a coupling system in an intermediate configuration in accordance with one embodiment.
Figure 7:
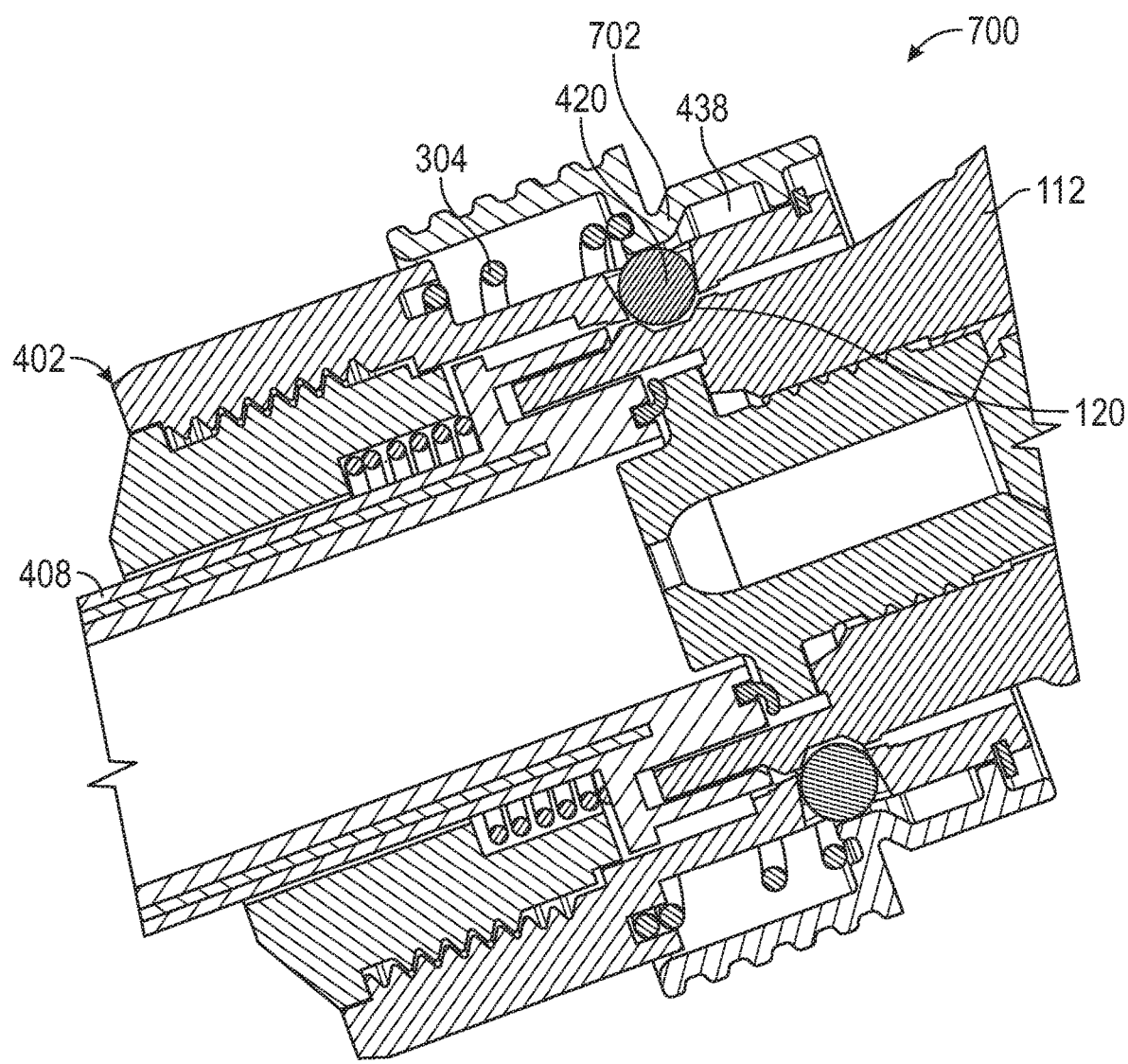
FIG. 7 illustrates a cross section view of a coupling system in a locked configuration in accordance with one embodiment.

FIG. 5, FIG. 6, and FIG. 7 illustrate generally, in cross-section views, an example that can include coupling the nozzle assembly 112 to the socket assembly 402. The cross-section views help illustrate relative movement of the various components of the nozzle assembly 112 and the socket assembly 402 throughout a coupling event, such as from the detached coupling state in the example of FIG. 4 through a fully-coupled and locked state in the example of FIG. 7.

FIG. 5 illustrates generally a cross-section view of the plug tip portion 126 of the nozzle assembly 112 received by the socket assembly 402. In the example of FIG. 5, the socket assembly 402 is in a released configuration 500. In the released configuration 500, the nozzle assembly 112 is unlocked or removable from the socket assembly 402. The collar 302 can be in the distal position with the first locking element 420 disposed in the first locking element receiver 438 in the collar 302. For example, the first locking element 420 can be bounded by the first locking element receiver 438, sidewalls of the first passage 440, and the second receiver outer wall 434.

In the example of FIG. 5, the receiver spring 310 can bias the plug receiver 408 away from the first shelf stop 426 and toward the second shelf stop 428 on the outer socket body 306. In turn, the position of the first locking element 420 can encourage the collar 302 toward its distal position (e.g., away from the nozzle assembly 112), thereby compressing the collar spring 304. In the example of FIG. 5, the plug tip portion 126 or the nozzle assembly 112 exerts little or no force on the plug receiver 408. In other words, in the released configuration 500, the nozzle assembly 112 begins to impinge on the plug receiver 408 such that the nipple 118 can be received by a sealing ring 308 at the proximal face of the first end 416 of the plug receiver 408.

FIG. 6 illustrates generally the socket assembly 402 in an intermediate configuration 600. In the intermediate configuration 600, the nozzle assembly 112 is coupled with the plug receiver 408 and, in response to a force applied to the nozzle assembly 112 in the axial direction, the nozzle assembly 112 advances in the axial direction. That is, the nozzle housing sidewall 122 can be coupled with an annular trough 410 of the plug receiver 408 (see, e.g., FIG. 8 for a perspective view of the annular trough 410). The plug receiver 408 can be depressed or moved, such as against a force direction of the receiver spring 310. In an example, the plug receiver 408 can move along the socket axis 404 until the receiver shelf 430 contacts the first shelf stop 426 or until the receiver spring 310 impedes further movement of the plug receiver 408.

In the intermediate configuration 600, the housing groove 120 can be positioned adjacent to the first passage 440. The housing groove 120 can receive the first locking element 420 in coordination with the collar 302 advancing in the proximal direction. That is, when the collar 302 moves in the proximal direction a collar inner wall 602 of the first locking element receiver 438 portion of the collar 302 can bias the first locking element 420 radially inward toward the socket axis 404 and into the housing groove 120.

In the example of FIG. 6, the receiver spring 310 can be compressed under the insertion force of the nozzle assembly 112 along the axial direction. With the receiver spring 310 so compressed, the first locking element 420 can be released from its position in the first locking element receiver 438 of the collar 302, which in turn can release the collar 302 to move in response to a bias force from the collar spring 304.

In an example, the coupling system 400 can be held in the intermediate configuration 600 of FIG. 6 by a user or operator advancing the collar 302 in the distal direction. For example, an operator can adjust the collar 302 to its distal position and thus use the intermediate configuration 600 to release the locking features and thereby remove the nozzle assembly 112 from the socket assembly 402.

FIG. 7 illustrates generally the socket assembly 402 in a locked configuration 700. In the locked configuration 700, the nozzle assembly 112 is locked or secured into position in the nozzle assembly 112 such that the nozzle assembly 112 cannot be withdrawn from the socket assembly 402 without a user unlocking action applied to the socket assembly 402.

In the example of FIG. 7, a collar retainer wall 702, such as comprising a portion of the collar 302, biases the first locking element 420 toward the socket axis 404 and into the housing groove 120. The collar spring 304 ensures the collar retainer wall 702 maintains its position adjacent to the first locking element 420 to maintain the nozzle assembly 112 inside of the socket assembly 402.

In an example, to decouple the nozzle assembly 112 from the socket assembly 402, the collar 302 can be moved axially, by a user or operator, in the distal direction to thereby compress the collar spring 304 and release the first locking element 420 into the first locking element receiver 438 of the collar 302. In other words, when the collar 302 is moved to unlock or decouple the nozzle assembly 112 from the socket assembly 402, the first locking element 420 can be released from the housing groove 120 such that the plug receiver 408 can move toward the proximal side of the socket assembly 402 and the nozzle assembly 112 can be withdrawn.

Figure 8:
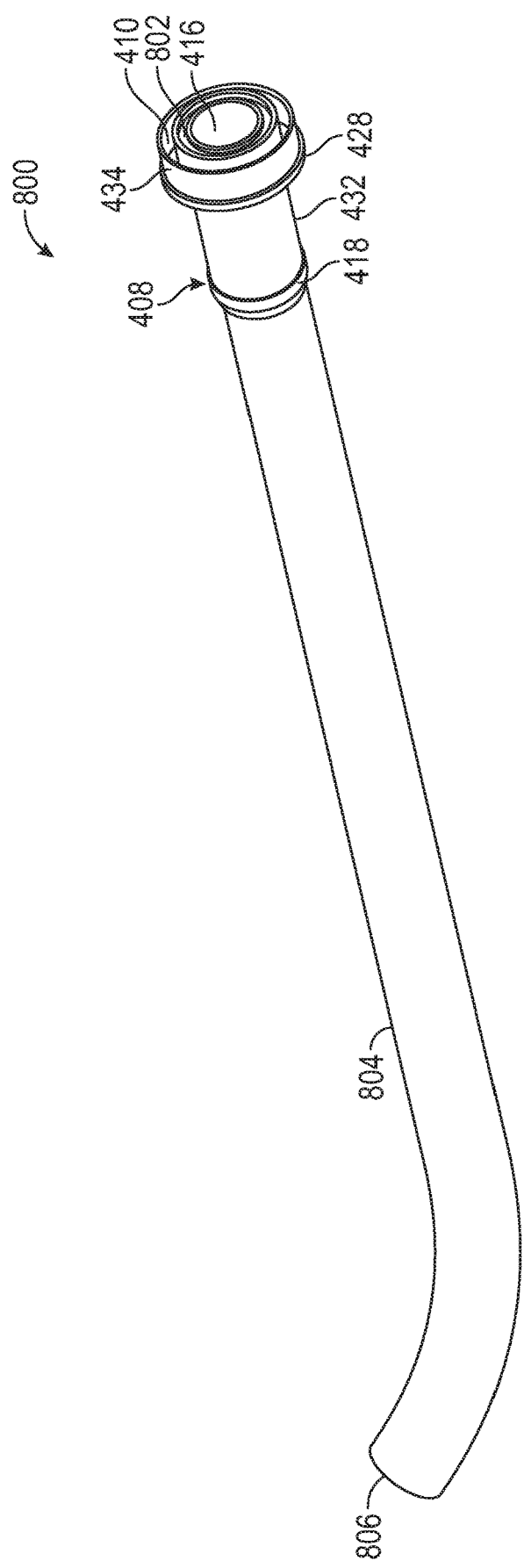
FIG. 8 illustrates a perspective view of a wand accessory in accordance with one embodiment.

FIG. 8 illustrates generally an example of the wand accessory 800. The wand accessory 800 can include or comprise the plug receiver 408, such as at a proximal end of the wand accessory 800. In an example, the wand accessory 800 comprises an o-ring seat 802 configured to mate with the sealing ring 308, the elongate tube 804, and a discharge opening 806.

FIG. 8 illustrates, in a perspective view, various components or features of the plug receiver 408. For example. FIG. 8 illustrates that the annular trough 410 that can be configured to receive the nozzle housing sidewall 122 from the plug tip portion 126 of the nozzle assembly 112. FIG. 8 further illustrates the first end 416 at the proximal side of the wand accessory 800, such as can be configured to receive the nipple 118 of the nozzle assembly 112. At the second end 418, the plug receiver 408 can be coupled to the elongate tube 804. FIG. 8 further illustrates the second shelf stop 428, such as can be provided at an intersection of the first receiver outer wall 432 and the second receiver outer wall 434.

Figure 9:
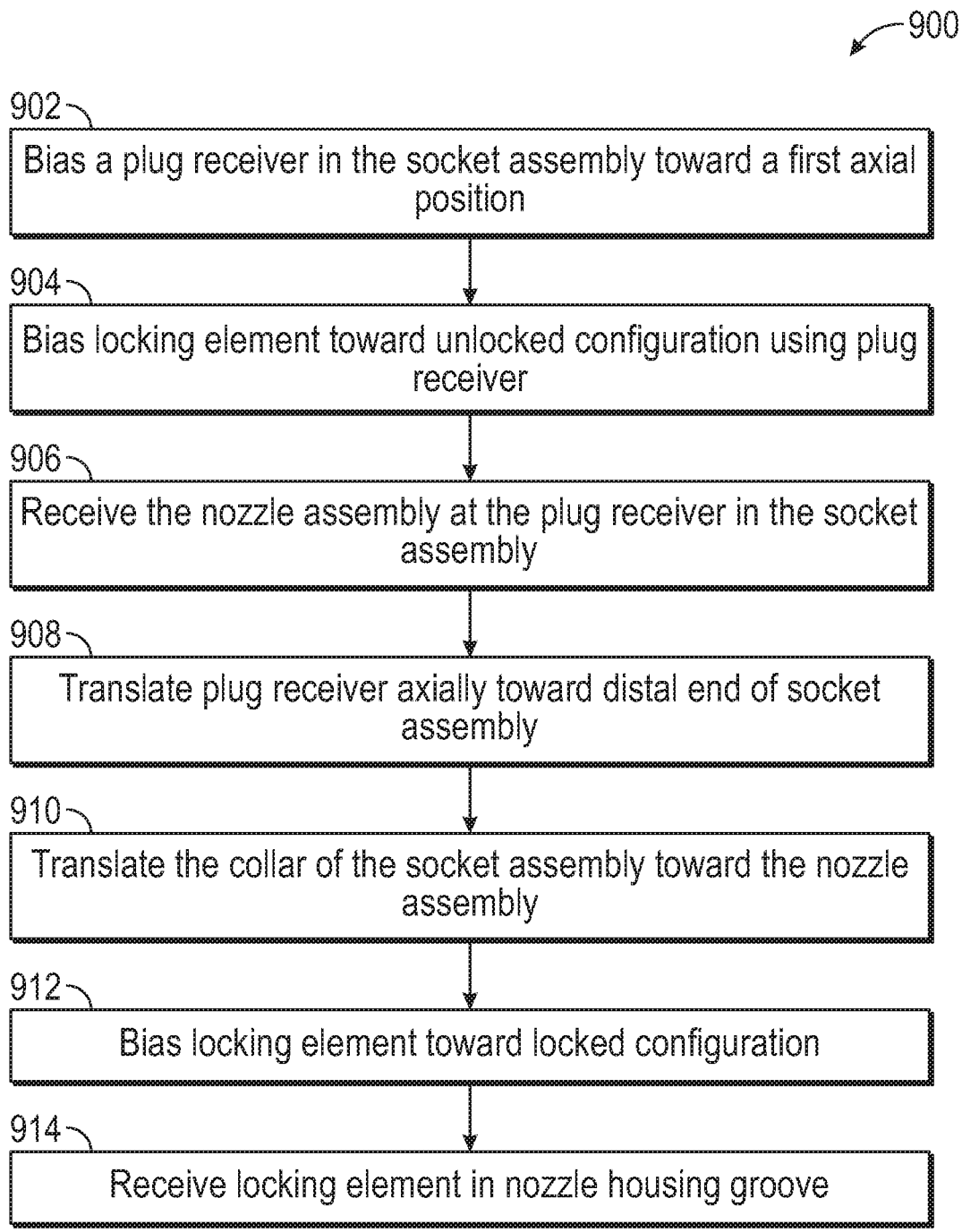
FIG. 9 illustrates a coupling method for operating a push-to-connect and quick-release coupling in accordance with one embodiment.

FIG. 9 illustrates generally an example of a coupling method 900 such as can include or use a coupling socket, such as can include the coupler 300. The coupling method 900 can begin at block 902 with biasing or moving the plug receiver 408 to a first axial position. The first axial position can be at or near a receiving side or proximal side of the coupler. When the plug receiver 408 is provided at the first axial position, block 904 can include biasing a locking element, such as the first locking element 420, toward an unlocked configuration. In an example, a portion of the plug receiver 408 can be used to bias the first locking element 420 toward the unlocked configuration. For example, a second receiver outer wall 434 of the plug receiver 408 can be provided at or adjacent to one or more of the passages in the outer socket body 306 to thereby bias or hold the locking elements in the unlocked configuration.

At block 906, the coupling method 900 can include receiving a nozzle, such as comprising the nozzle assembly 112, in the socket assembly 402. Block 906 can include receiving the nozzle assembly 112 in or using the plug receiver 408. For example, block 906 can include receiving the nozzle housing sidewall 122 in the annular trough 410 of the plug receiver 408. Following block 906, the coupling method 900 can include advancing the nozzle assembly 112 axially and distally into the socket assembly 402. In response to the advancing nozzle assembly 112, block 908 can include translating the plug receiver 408 axially and distally, such as relative to the outer socket body 306, among other components of the socket assembly 402.

In coordination with the advancing plug receiver 408 in the distal direction, at block 910, the collar 302 can translate or advance axially in an opposite or proximal direction. That is, block 910 can include translating the collar 302 proximally toward a nozzle-receiving end of the socket assembly 402.

When the collar 302 advances in the proximal direction, the collar retainer wall 702 can correspondingly advance proximally and, at block 912, can bias or push the first locking element 420 into the first passage 440 and, at block 914, into the housing groove 120. With the first locking element 420 in the housing groove 120, the socket assembly 402 and the nozzle assembly 112 can be fixedly coupled together and fluid can pass from the nipple 118 of the nozzle assembly 112 into or through the plug receiver 408.

In an example, to decouple the nozzle assembly 112 from the socket assembly 402, the collar 302 can be advanced (e.g., manually by an operator) in the distal direction, against a bias of the collar spring 304, to release the locking elements into corresponding receiving portions of the collar 302. With the locking elements released and withdrawn, the nozzle assembly 112 can be decoupled from the socket assembly 402.

Figure 10:
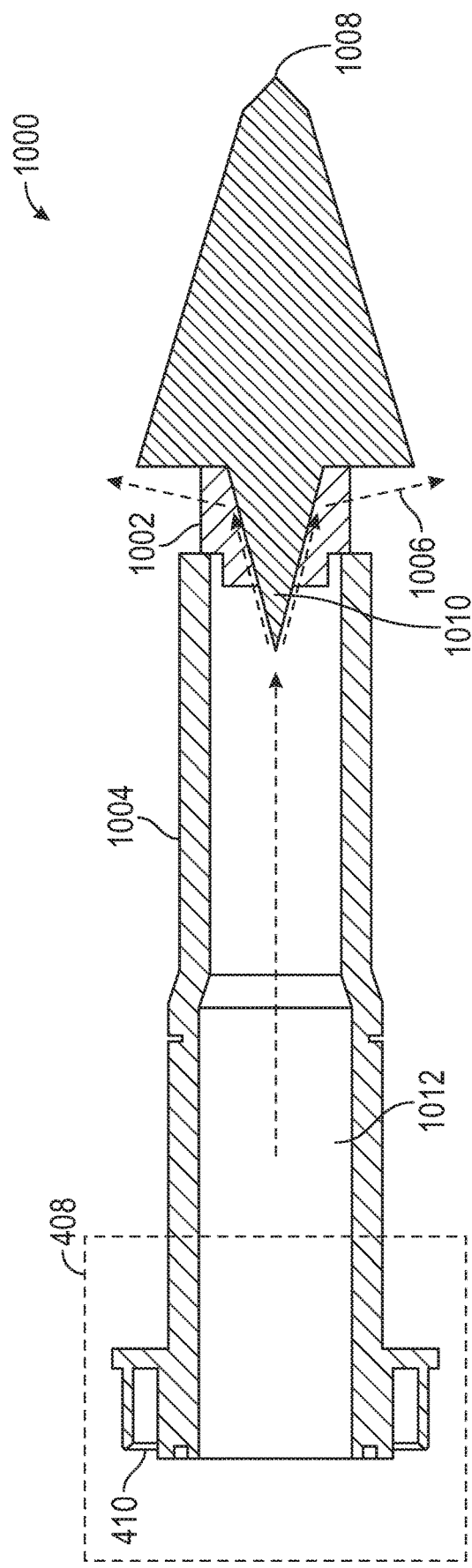
FIG. 10 illustrates a cross-section view of a pierce and disperse accessory in accordance with one embodiment.

FIG. 10 illustrates generally a cross section view of a pierce and disperse accessory 1000. In an example, the pierce and disperse accessory 1000 comprises the plug receiver 408 such as for use in coupling the pierce and disperse accessory 1000 with the coupler 300. The plug receiver 408 can include the annular trough 410 around an entrance to a hollow central shaft 1012 of the pierce and disperse accessory 1000 that is configured to transmit fire extinguisher agent from the nozzle assembly 112 to an outlet or discharge opening.

The pierce and disperse accessory 1000 comprises a shaft portion 1004 coupled at one end to the plug receiver 408, and coupled at the other end to a distal discharge opening 1002. The discharge opening 1002 can be configured to receive agent transmitted via the hollow central shaft 1012 to release agent in an output stream 1006. The pierce and disperse accessory 1000 can include, at its distal end, a piercing structure 1008 such as can be configured with a rigid, pointed tip for piercing materials such as wood or sheetrock walls, vehicle sidewalls (e.g., comprising aluminum, steel, fiberglass, or other materials) or other barriers. A distal portion of the pierce and disperse accessory 1000, including the piercing structure 1008 and the discharge opening 1002, can be configured for insertion completely inside of a fire hazard environment such that the discharge opening 1002 can release agent to treat a fire.

In an example, the pierce and disperse accessory 1000 comprises an inner stream director 1010 that is configured to direct pressurized agent outward and away from the pierce and disperse accessory 1000. In the example of FIG. 10, the discharge opening 1002 can be configured to use the stream director 1010 to direct agent to multiple different openings that are distributed around a circumference of the pierce and disperse accessory 1000 and to thereby facilitate release of an extinguisher agent radially in substantially all directions.

Figure 11:
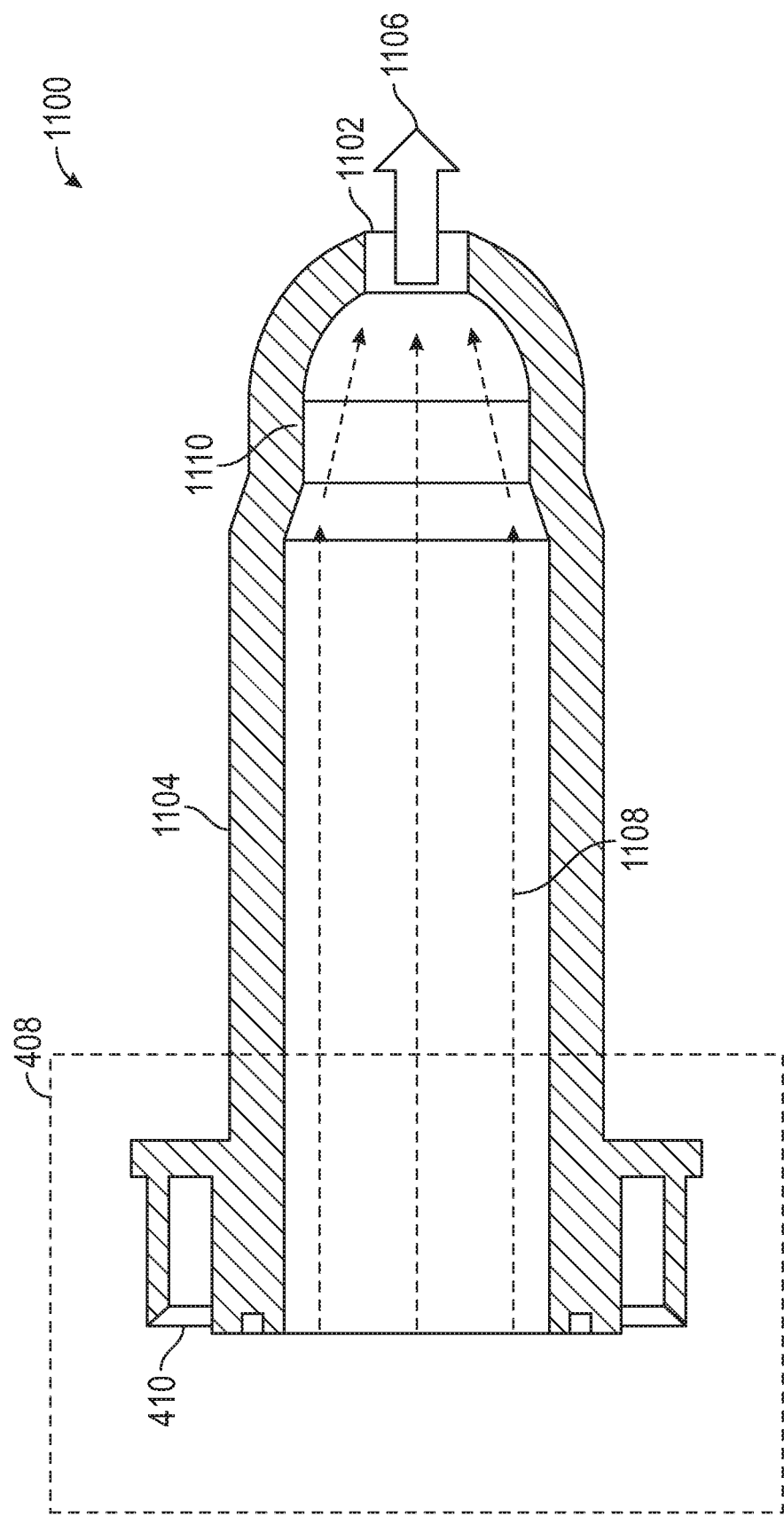
FIG. 11 illustrates a cross-section view of a converged stream accessory in accordance with one embodiment.

FIG. 11 illustrates generally a cross section view of a converged stream accessory 1100. In an example, the converged stream accessory 1100 comprises the plug receiver 408 such as for use in coupling the converged stream accessory 1100 with the coupler 300. The plug receiver 408 can include the annular trough 410 around an entrance to a hollow central shaft 1108 of the converged stream accessory 1100 that is configured to transmit fire extinguisher agent from the nozzle assembly 112 to an outlet or discharge opening.

The converged stream accessory 1100 comprises a shaft portion 1104 coupled at one end to the plug receiver 408, and coupled at the other end to a distal discharge opening 1102. The discharge opening 1102 can be configured to receive agent transmitted via the hollow central shaft 1108 to release agent in an output stream 1106. The converged stream accessory 1100 can include, at its distal portion, a convergence portion 1110 such as can include tapered sidewalls that run from a larger diameter at the shaft portion 1104 to a smaller diameter at the discharge opening 1102. The convergence portion 1110 can be configured to restrict agent flow to thereby increase pressure and focus an agent stream released from the converged stream accessory 1100.

Figure 12:
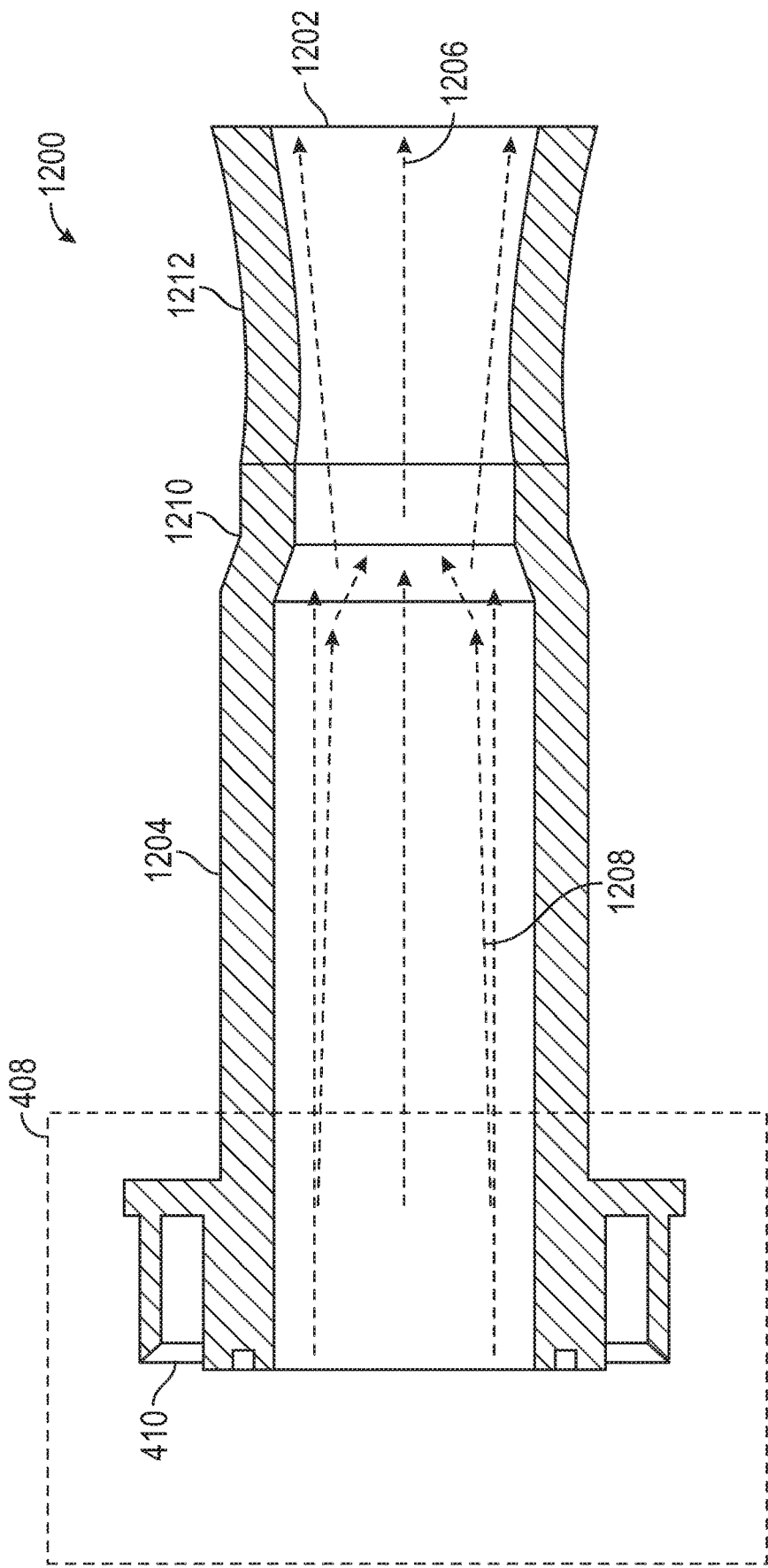
FIG. 12 illustrates a cross-section view of a fan stream accessory in accordance with one embodiment.

FIG. 12 illustrates generally a cross section view of a fan stream accessory 1200. In an example, the fan stream accessory 1200 comprises the plug receiver 408 such as for use in coupling the fan stream accessory 1200 with the coupler 300. The plug receiver 408 can include the annular trough 410 around an entrance to a hollow central shaft 1208 of the fan stream accessory 1200 that is configured to transmit fire extinguisher agent from the nozzle assembly 112 to an outlet or discharge opening.

The fan stream accessory 1200 comprises a shaft portion 1204 coupled at one end to the plug receiver 408, and coupled at the other end to a distal discharge opening 1202. The discharge opening 1202 can be configured to receive agent transmitted via the hollow central shaft 1208 to release agent in an output stream 1206.

The fan stream accessory 1200 can include, along its length from its proximal to distal portions, a flow restrictor 1210 and a divergent portion 1212. At the flow restrictor 1210, agent flowing in the hollow central shaft 1208 can be restricted such as due to the circumferential change from a larger to a smaller diameter at the flow restrictor 1210. Following the flow restrictor 1210, the divergent portion 1212 can comprise a relatively larger, distally-tapered portion leading to the discharge opening 1202. At the discharge opening 1202, the output stream 1206 can have a controlled divergent pattern or fan pattern. In an example, the output stream 1206 can provide a controlled, less-turbulent flow of agent from the nozzle assembly 112 than would be realized from the nozzle alone.

Figure 13:
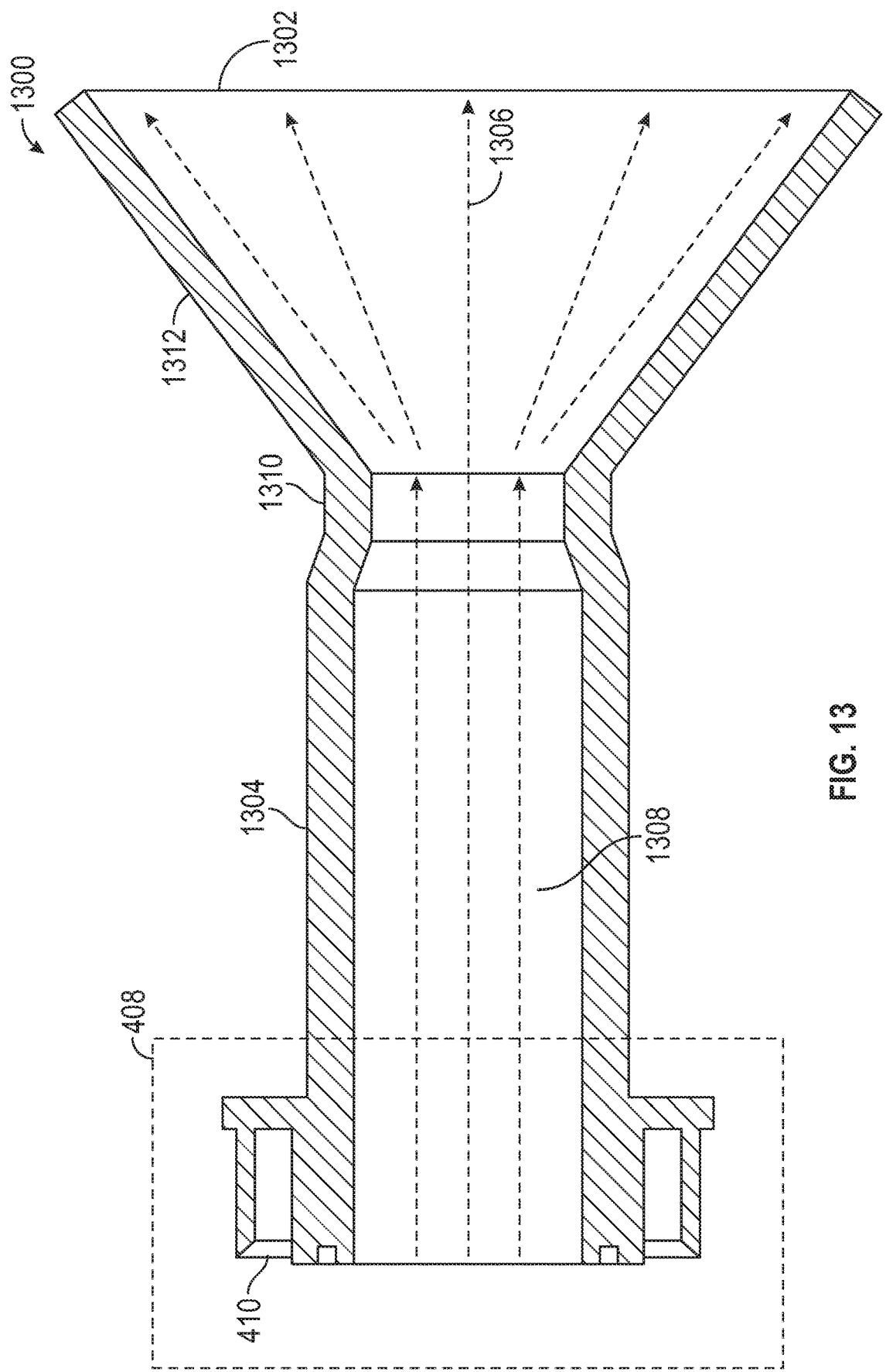
FIG. 13 illustrates a cross-section view of a wide-angle stream accessory in accordance with one embodiment.

FIG. 13 illustrates generally a cross section view of a wide-angle stream accessory 1300. In an example, the wide-angle stream accessory 1300 comprises the plug receiver 408 such as for use in coupling the wide-angle stream accessory 1300 with the coupler 300. The plug receiver 408 can include the annular trough 410 around an entrance to a hollow central shaft 1308 of the wide-angle stream accessory 1300 that is configured to transmit fire extinguisher agent from the nozzle assembly 112 to an outlet or discharge opening.

The wide-angle stream accessory 1300 comprises a shaft portion 1304 coupled at one end to the plug receiver 408, and coupled at the other end to a distal discharge opening 1302. The discharge opening 1302 can be configured to receive agent transmitted via the hollow central shaft 1308 to release agent in a wide-angle, fog pattern output stream 1306.

The wide-angle stream accessory 1300 can include, along its length from its proximal to distal portions, a flow restrictor 1310 and a horn 1312. At the flow restrictor 1310, agent flowing in the hollow central shaft 1308 can be restricted such as due to the circumferential change from a larger to a smaller diameter at the flow restrictor 1310. Following the flow restrictor 1310, the horn 1312 can comprise a large opening, such as can be at least one and a half times the diameter of the hollow central shaft 1308, and preferably is two or more times the diameter of the hollow central shaft 1308. At the discharge opening 1302, the output stream 1306 can have a dispersed agent pattern or fog pattern, such as to release agent over a wide and unfocused area.

Various other accessories can be similarly configured for use with the nozzle assembly 112 and the coupler 300 to provide other patterns of fluid dispensation.

Various aspects of the present disclosure can be combined or used together.

Aspect 1 can include or use subject matter (such as an apparatus, a system, a device, a method, or a means for performing acts, or an article of manufacture), such as can include or use a push-to-connect and quick-release coupling socket. The coupling socket can include a socket body extending between first and second socket faces, wherein the first socket face is configured to receive a plug, and a plug receiver at least partially inside the socket body and slidable axially relative to the socket body, wherein a first end of the plug receiver is configured to couple with a dispenser tip of the plug, and wherein a second end of the plug receiver is configured to dispense flowable material received from the plug, and a collar movably coupled along the socket body between a locked-coupling configuration and an unlocked configuration. In an example, in Aspect 1, in the unlocked configuration, the first end of the plug receiver is distal to the second socket face, and a locking element is unbiased by the collar, and in the locked-coupling configuration, the first end of the plug receiver is proximal to the second socket face, and the collar biases the locking element toward a lock receiver of the plug.

Aspect 2 can include or use, or can optionally be combined with the subject matter of Aspect 1, to optionally include, in the unlocked configuration, an outer surface of the plug receiver biases the locking element toward the collar.

Aspect 3 can include or use, or can optionally be combined with the subject matter of one or any combination of Aspects 1 or 2 to optionally include the plug receiver biased toward the unlocked configuration by a first spring.

Aspect 4 can include or use, or can optionally be combined with the subject matter of one or any combination of Aspects 1 through 3 to optionally include the collar biased toward the locked-coupling configuration by a second spring.

Aspect 5 can include or use, or can optionally be combined with the subject matter of one or any combination of Aspects 1 through 4 to optionally include the plug receiver biased toward the unlocked configuration by a first spring, and the collar biased toward the locked-coupling configuration by a second spring, and the first and second springs are coaxial with an axis of the socket body.

Aspect 6 can include or use, or can optionally be combined with the subject matter of one or any combination of Aspects 1 through 5 to optionally include the plug receiver configured to receive material through an axial orifice in the plug.

Aspect 7 can include or use, or can optionally be combined with the subject matter of one or any combination of Aspects 1 through 6 to optionally include the plug receiver and collar configured to slide along an axis of the socket body in different directions when the coupling socket transitions from the locked-coupling configuration to the unlocked configuration or when the coupling socket transitions from the unlocked configuration to the locked-coupling configuration.

Aspect 8 can include or use, or can optionally be combined with the subject matter of one or any combination of Aspects 1 through 7 to optionally include, in the plug receiver, an axial inner passage configured to receive the flowable material from the plug and release the material at the second end of the plug receiver, a first outer wall portion extending along a first length of the plug receiver and having a first radial dimension, and a second outer wall portion extending along a second length of the plug receiver and having a greater second radial dimension, wherein the second outer wall portion is configured to bias the locking element toward the collar when the collar is in the unlocked configuration.

Aspect 9 can include or use, or can optionally be combined with the subject matter of Aspect 8, to optionally include a first shelf between the first and second outer wall portions of the plug receiver, wherein the socket body includes a first shelf stop, and wherein a travel of the plug receiver along an axis of the socket body is limited in a first direction by engagement of the first shelf and the first shelf stop.

Aspect 10 can include or use, or can optionally be combined with the subject matter of Aspect 9, to optionally include the socket body having a second shelf stop spaced axially apart from the first shelf stop, and travel of the plug receiver along the axis is limited in a second direction by engagement of the first shelf and the second shelf stop.

Aspect 11 can include or use, or can optionally be combined with the subject matter of one or any combination of Aspects 1 through 10 to optionally include the plug receiver having, at the first end, a receiving trough configured to receive a housing portion of the plug.

Aspect 12 can include or use, or can optionally be combined with the subject matter of Aspect 11, to optionally include the receiving trough having or being an annular trough configured to receive an annular housing portion of the plug.

Aspect 13 can include or use, or can optionally be combined with the subject matter of one or any combination of Aspects 1 through 12 to optionally include the plug receiver comprising a dispenser assembly that is removable by a user.

Aspect 14 can include or use subject matter (such as an apparatus, a system, a device, a method, or a means for performing acts, or an article of manufacture), such as can include a fire extinguisher nozzle coupling system comprising an accessory socket body and an automatic locking assembly including a collar movably coupled with the socket body and a movable locking element. In Aspect 14, in a locked configuration wherein a plug portion of a fire extinguisher nozzle is retained in the socket body, the collar is disposed in a first position and the locking element is biased by the collar toward the plug portion of the fire extinguisher nozzle, and in a released configuration wherein the plug portion of the fire extinguisher nozzle is removable from the socket body, the collar is disposed in a second position and the locking element is unbiased by the collar.

Aspect 15 can include or use, or can optionally be combined with the subject matter of Aspect 14, to optionally include the automatic locking assembly further including an intermediate configuration wherein the locking element is biased by the plug portion of the fire extinguisher nozzle toward the collar.

Aspect 16 can include or use, or can optionally be combined with the subject matter of one or any combination of Aspects 14 or 15 to optionally include a receiver provided at least partially inside the socket body and slidable axially relative to the socket body, wherein a first end of the receiver is configured to engage a nipple at the plug portion of the nozzle, and wherein a second end of the receiver is configured to dispense flowable material received from the nozzle.

Aspect 17 can include or use, or can optionally be combined with the subject matter of Aspect 16, to optionally include the fire extinguisher nozzle, the nozzle comprising the nipple portion at a dispenser end of the nozzle assembly and a nozzle sheath spaced apart from, and at least partially surrounding, the nipple portion. In Aspect 17, the receiver can include a trough configured to engage the nozzle sheath in the locked configuration.

Aspect 18 can include or use, or can optionally be combined with the subject matter of Aspect 17, to optionally include the locking assembly configured to transition from the locked configuration to the released configuration in response to movement of the collar (e.g., provided or applied by a user) in an insertion direction of the nozzle to the socket body.

Aspect 19 can include or use, or can optionally be combined with the subject matter of one or any combination of Aspects 14 through 18 to optionally include the nozzle, wherein the nozzle is configured to dispense the flowable material with or without being coupled with the socket body.

Aspect 20 can include or use, or can optionally be combined with the subject matter of one or any combination of Aspects 14 through 19 to optionally include the nozzle, wherein the nozzle comprises a valve configured to control flow of a flowable material through the nozzle.

Aspect 21 can include or use, or can optionally be combined with the subject matter of one or any combination of Aspects 14 through 20 to optionally include the fire extinguisher nozzle, wherein the locking assembly is configured to receive the nozzle in a push-to-connect manner and wherein the locking assembly is configured to release the nozzle in response to a user action moving the collar from the first position to the second position.

Aspect 22 can include or use subject matter (such as an apparatus, a system, a device, a method, or a means for performing acts, or an article of manufacture), such as can include or use a method for operating a push-to-connect and quick-release coupling, the coupling comprising a socket assembly having a socket body, a plug receiver inside of the socket body, and a collar movably coupled to the socket body, and the coupling comprising a nozzle assembly having a housing and a plug, wherein the nozzle assembly is configured to dispense a flowable material therethrough. In Aspect 22, the method can include biasing a plug receiver in the socket assembly toward a first axial position and thereby biasing a locking element in the socket assembly toward an unlocked configuration using an outer face of the plug receiver, receiving the nozzle assembly at the plug receiver in the socket assembly and, in response, translating the plug receiver axially toward a second axial position and away from the locking element, and translating the collar of the socket assembly toward the nozzle assembly and thereby biasing the locking element toward a locked configuration wherein the locking element is received in a groove in the nozzle housing and the socket assembly is secured to the nozzle assembly.

Aspect 23 can include or use, or can optionally be combined with the subject matter of Aspect 22, to optionally include decoupling the socket assembly and the nozzle assembly, including translating the collar of the socket assembly away from the nozzle assembly and thereby releasing the locking element from the locked configuration to the unlocked configuration wherein the locking element is expelled from the groove in the nozzle housing, and removing the nozzle assembly from the socket assembly.

Aspect 24 can include or use, or can optionally be combined with the subject matter of Aspect 23, to optionally include translating the collar of the socket assembly, including in response to an external force applied to the collar by a user to move the collar axially along the socket body.

Aspect 25 can include or use, or can optionally be combined with the subject matter of one or any combination of Aspects 22 through 24 to optionally include biasing the plug receiver in the socket assembly toward the first axial position including using a first spring in the socket assembly.

Aspect 26 can include or use, or can optionally be combined with the subject matter of Aspect 25, to optionally include translating the collar of the socket assembly toward the nozzle assembly including using a second spring in the socket assembly, wherein the first and second springs are concentric about an axis of the socket assembly.

Aspect 27 can include or use, or can optionally be combined with the subject matter of one or any combination of Aspects 22 through 26 to optionally include receiving the nozzle assembly at the plug receiver including receiving an annular housing wall of the nozzle assembly using an annular trough in the plug receiver to thereby maintain a substantially collinear relationship between an axis of the nozzle assembly and an axis of the socket assembly during coupling or decoupling of the socket assembly and the nozzle assembly.

Each of these non-limiting aspects can stand on its own or can be combined in various permutations or combinations with one or more of the other examples.

This detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. The present inventors contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein."

In the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A push-to-connect and quick-release coupling socket comprising:
    a socket body extending between first and second socket faces, the socket body comprising a first shelf stop and a collar movably coupled along the socket body between a locked coupling configuration and an unlocked configuration, wherein the first socket face is configured to receive a plug;
    a plug receiver at least partially inside the socket body and slidable axially relative to the socket body, wherein a first end of the plug receiver is configured to couple with a dispenser tip of the plug, and wherein a second end of the plug receiver is configured to dispense flowable material received from the plug, the plug receiver comprising:
        an axial inner passage configured to receive the flowable material from the plug and release the material at the second end of the plug receiver;
        a first outer wall portion extending along a first length of the plug receiver and having a first radial dimension;
        a second outer wall portion extending along a second length of the plug receiver and having a greater second radial dimension;
        wherein the second outer wall portion is configured to bias the locking element toward the collar when the collar is in the unlocked configuration;
        a first shelf between the first and second outer wall portions of the plug receiver;
    wherein a travel of the plug receiver along an axis of the socket body is limited in a first direction by engagement of the first shelf and the first shelf stop; and
    when in the unlocked configuration, the first end of the plug receiver is distal to the second socket face, and a locking element is unbiased by the collar; and
    when in the locked-coupling configuration, the first end of the plug receiver is proximal to the second socket face, and the collar biases the locking element toward a lock receiver of the plug.

2. The coupling socket of claim 1, wherein in the unlocked configuration, an outer surface of the plug receiver biases the locking element toward the collar.

3. The coupling socket of claim 1, wherein the plug receiver is biased toward the unlocked configuration by a first spring;
    wherein the collar is biased toward the locked-coupling configuration by a second spring; and wherein the first and second springs are coaxial with an axis of the socket body.

4. The coupling socket of claim 1, wherein the plug receiver and collar are configured to slide along an axis of the socket body in different directions when the coupling socket transitions from the locked-coupling configuration to the unlocked configuration or when the coupling socket transitions from the unlocked configuration to the locked-coupling configuration.

5. The coupling socket of claim 1, wherein the socket body includes a second shelf stop spaced axially apart from the first shelf stop, and travel of the plug receiver along the axis is limited in a second direction by engagement of the first shelf and the second shelf stop.

6. The coupling socket of claim 1, wherein the plug receiver includes, at the first end, a receiving trough configured to receive a housing portion of the plug.

7. The coupling socket of claim 6, wherein the receiving trough is an annular trough configured to receive an annular housing portion of the plug.

8. A fire extinguisher nozzle coupling system comprising:
    an accessory socket body, the socket body further comprising a first shelf stop and a collar movably coupled along the socket body between a locked coupling configuration and an unlocked configuration, and a movable locking element; and
    a receiver provided at least partially inside the socket body and slidable axially relative to the socket body, the receiver comprising:
        a first end;
        an axial inner passage configured to receive a flowable material from the plug and release the material at a second end of the receiver;
        a first outer wall portion extending along a first length of the receiver and having a first radial dimension;
        a second outer wall portion extending along a second length of the receiver and having a greater second radial dimension;
        wherein the second outer wall portion is configured to bias the locking element toward the collar when the collar is in the unlocked configuration;
        a first shelf between the first and second outer wall portions of the plug receiver;
    wherein a travel of the receiver along an axis of the socket body is limited in a first direction by engagement of the first shelf and the first shelf stop;
    wherein:
        in a locked configuration wherein a plug portion of a fire extinguisher nozzle is retained in the socket body, the collar is disposed in a first position and the locking element is biased by the collar toward the plug portion of the fire extinguisher nozzle;

in a released configuration wherein the plug portion of the fire extinguisher nozzle is removable from the socket body, the collar is disposed in a second position and the locking element is unbiased by the collar; and a first end of the receiver is configured to engage a nipple at the plug portion of the nozzle, and wherein a second end of the receiver is configured to dispense flowable material received from the nozzle.

9. The coupling system of claim 8, wherein the automatic locking assembly further includes an intermediate configuration wherein the locking element is biased by the plug portion of the fire extinguisher nozzle toward the collar.

10. The coupling system of claim 8, further comprising the fire extinguisher nozzle, the nozzle comprising:
the nipple portion at a dispenser end of the nozzle assembly; and
a nozzle sheath spaced apart from, and at least partially surrounding, the nipple portion;
wherein the receiver comprises a trough configured to engage the nozzle sheath in the locked configuration.

11. The coupling system of claim 10, wherein the locking assembly transitions from the locked configuration to the released configuration in response to movement of the collar in an insertion direction of the nozzle to the socket body.

12. The coupling system of claim 8, further comprising the fire extinguisher nozzle, wherein the locking assembly is configured to receive the nozzle in a push-to-connect manner and wherein the locking assembly is configured to release the nozzle in response to a user action moving the collar from the first position to the second position.

13. A method for operating a push-to-connect and quick-release coupling, the coupling comprising a socket assembly having a socket body extending between first and second socket faces, the socket body comprising a first shelf stop, a plug receiver inside of the socket body, and slidable axially relative to the socket body, and a collar movably coupled to the socket body, and the coupling comprising a nozzle assembly having a housing and a plug, wherein the nozzle assembly is configured to dispense a flowable material therethrough, the plug receiver comprising:
an axial inner passage configured to receive the flowable material from the plug and release the material at the second end of the plug receiver;
a first outer wall portion extending along a first length of the plug receiver and having a first radial dimension;
a second outer wall portion extending along a second length of the plug receiver and having a greater second radial dimension;
wherein the second outer wall portion is configured to bias the locking element toward the collar when the collar is in the unlocked configuration;
a first shelf between the first and second outer wall portions of the plug receiver;
wherein a travel of the plug receiver along an axis of the socket body is limited in a first direction by engagement of the first shelf and the first shelf stop;
the method comprising:
biasing the plug receiver in the socket assembly toward a first axial position and thereby biasing a locking element in the socket assembly toward an unlocked configuration using an outer face of the plug receiver;
receiving the nozzle assembly at the plug receiver in the socket assembly and, in response, translating the plug receiver axially toward a second axial position and away from the locking element; and
translating the collar of the socket assembly toward the nozzle assembly and thereby biasing the locking element toward a locked configuration wherein the locking element is received in a groove in the nozzle housing and the socket assembly is secured to the nozzle assembly.

14. The method of claim 13, further comprising decoupling the socket assembly and the nozzle assembly, including:
translating the collar of the socket assembly away from the nozzle assembly and thereby releasing the locking element from the locked configuration to the unlocked configuration wherein the locking element is expelled from the groove in the nozzle housing; and
removing the nozzle assembly from the socket assembly.

15. The method of claim 14, wherein translating the collar of the socket assembly includes in response to an external force applied to the collar by a user to move the collar axially along the socket body.

16. The method of claim 13, wherein biasing the plug receiver in the socket assembly toward the first axial position includes using a first spring in the socket assembly.

17. The method of claim 16, wherein translating the collar of the socket assembly toward the nozzle assembly includes using a second spring in the socket assembly, wherein the first and second springs are concentric about an axis of the socket assembly.

18. The method of claim 13, wherein receiving the nozzle assembly at the plug receiver includes receiving an annular housing wall of the nozzle assembly using an annular trough in the plug receiver to thereby maintain a substantially collinear relationship between an axis of the nozzle assembly and an axis of the socket assembly during coupling or decoupling of the socket assembly and the nozzle assembly.

* * * * *